UNITED STATES PATENT OFFICE.

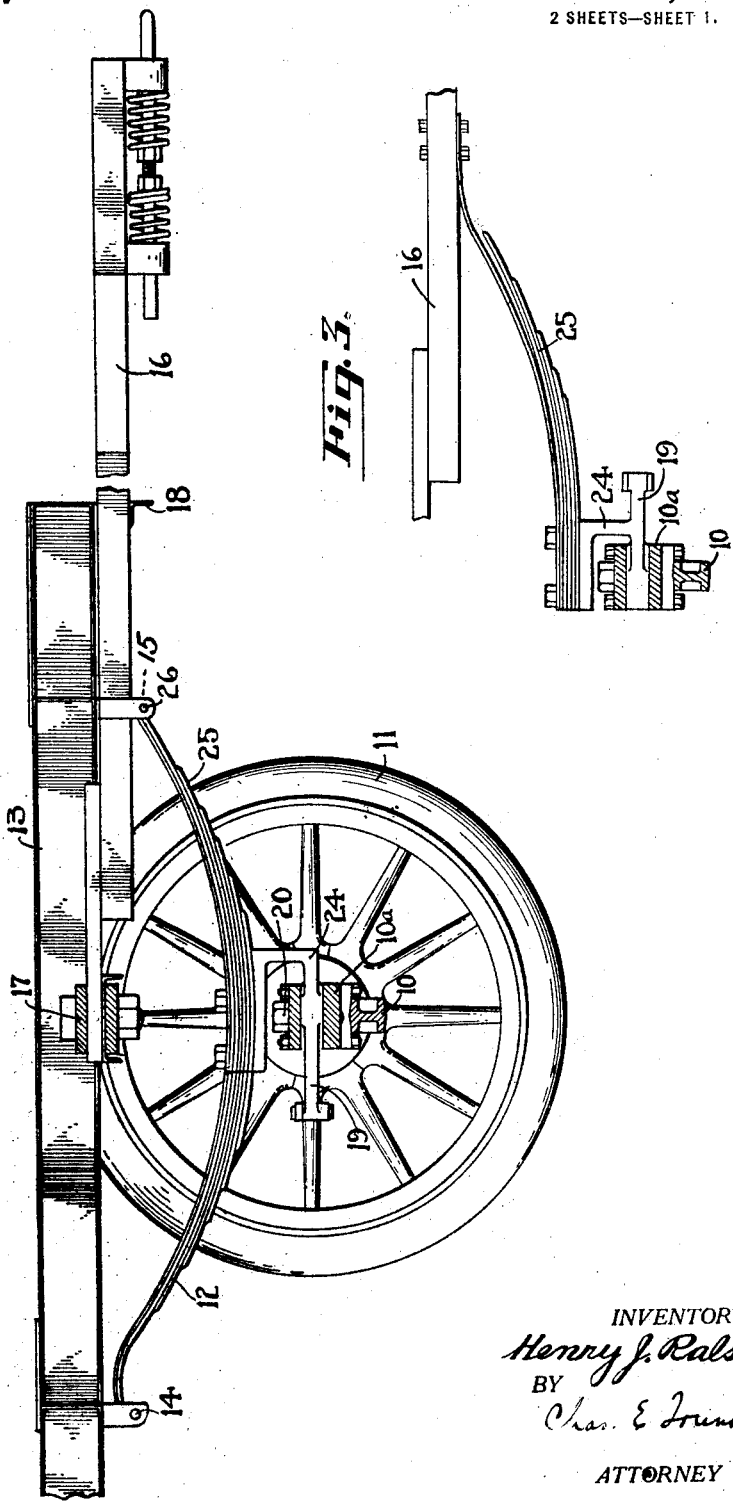

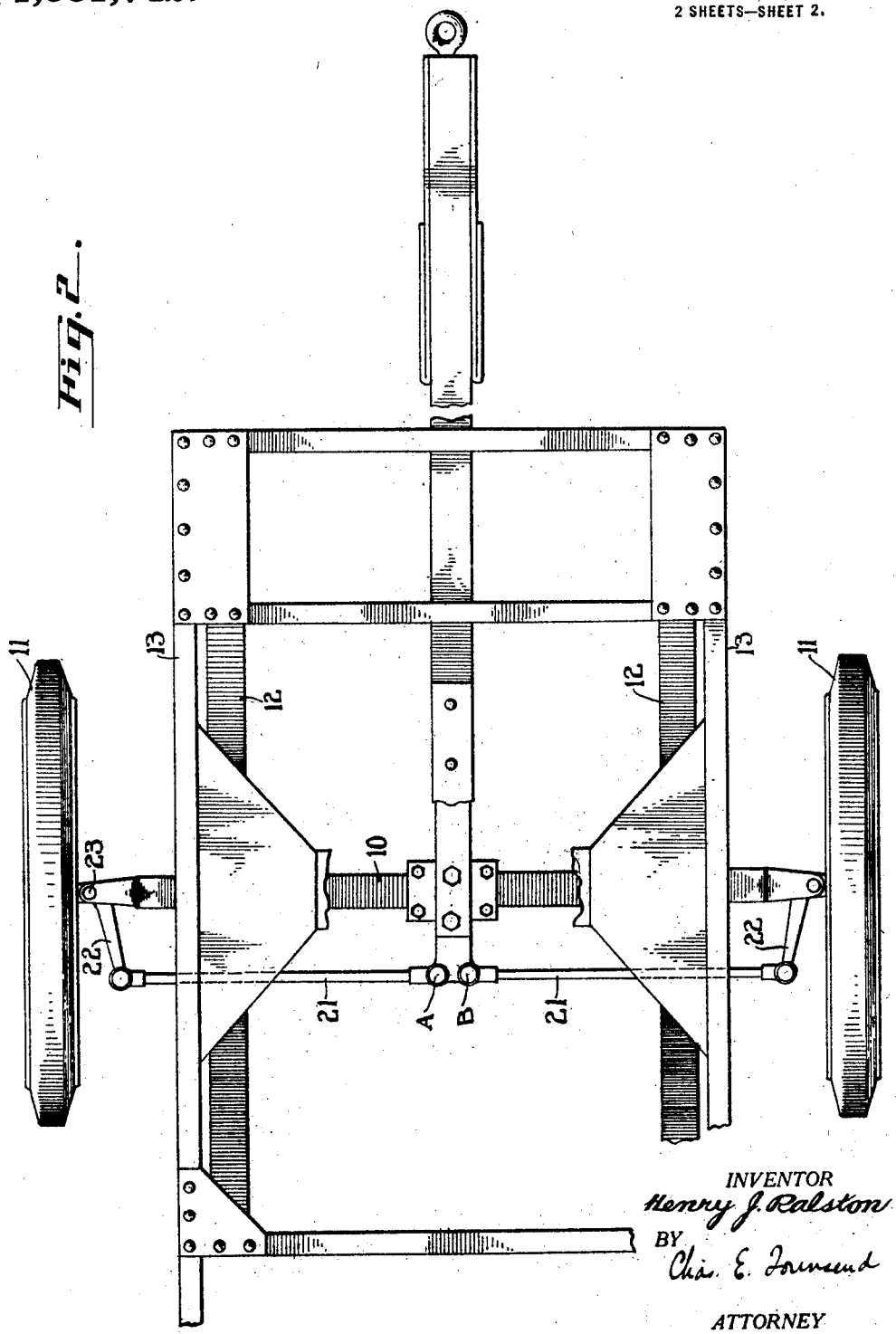

HENRY J. RALSTON, OF SAN FRANCISCO, CALIFORNIA.

TRAILER-STEERING DEVICE.

1,381,742.  Specification of Letters Patent.  Patented June 14, 1921.

Application filed April 14, 1920. Serial No. 373,887.

*To all whom it may concern:*

Be it known that I, HENRY J. RALSTON, a citizen of the United States, residing at San Francisco, in the county of San Francisco and State of California, have invented a new and useful Improvement in Trailer-Steering Devices, of which the following is a specification.

This invention relates to steering mechanisms for trailers of the type wherein the draw-bar is pivotally mounted on the main frame and the latter is supported by springs upon the axle.

The object is to provide a simple and inexpensive steering connection between the draw-bar and the steering wheels. Prior devices have usually embodied some form of loose connection to permit the frame and draw-bar to have the necessary movement relatively to the axle. In the present arrangement, I dispense with all loose connections by employing a leaf spring between the draw-bar and the steering lever on the axle, said spring being in a plane with and having points of connection in alinement with the semi-elliptical springs on which the main frame is supported. Consequently, the spring steering connection moves in the same path as the supporting springs and all loose or sliding connections can be dispensed with.

In the accompanying drawings,

Figure 1 shows a vertical central section view of a trailer embodying my invention.

Fig. 2 shows a plan view of the same.

Fig. 3 shows a modified arrangement of the spring connection between the draw-bar and the steering lever on the axle.

Referring more in detail to the accompanying drawings, I show an axle 10, steering wheels 11, semi-elliptical springs 12 on the axle, and a main frame 13 carried by the said springs. The springs have a shackle connection 14 at their rear ends and a fixed pivotal connection 15 at their forward ends.

The swinging draw-bar 16 is pivoted at its rear end as at 17 to the main frame and is free to swing laterally between cross-sills 18 thereon. On a support 10<sup>a</sup> carried between the springs, is a steering lever 19 connected thereto by a pivot pin 20 either at the rear end of the lever as shown in Fig. 3 or between the ends of the lever as shown in Fig. 1, depending on whether I employ a front or rear steering connection for the wheels. This lever at one of its ends has separate pivotal connections A and B with a pair of tie-bars 21, one of said tie-bars extending to the right-hand wheel and the other to the left-hand wheel and being connected thereto by means of an arm 22 which in normal position should lie on an incline corresponding with the angle of a line struck from the center of the rear axle through the steering knuckle 23 of its respective wheels.

Upon the forward end of the steering lever, as shown in Fig. 1, or intermediate the ends of said lever as shown in Fig. 3, I arrange a bracket 24 extending upwardly and over the axle and forming a seat for a laminated leaf spring 25, such seat being in a plane with the seats of the two supporting springs 12. This laminated spring connection serves as a steering link and extends forwardly and upwardly to a point exactly in line with the points 15 of the load carrying springs, where it connects with the draft-bar by means of a pivot pin 26. This end of the spring may be straight as shown in Fig. 1 or bent as shown in Fig. 3.

By arranging the points of connection of the steering spring member in line with the points of connection of the load carrying springs, the necessity for loose connections is overcome inasmuch as the movement of the main frame and the draw-bar relatively to the axle is that permitted by the forward ends of the load carrying springs and consequently the steering spring member being of the same shape and having its connections in line with said load carrying springs will have the same path of movement as the latter, so as to allow for the necessary changes in the relation between the draft-bar and the steering lever on the axle.

Where, as in Fig. 3, I arrange the tie-bars in front of the axle, the spring connection 25 may be used to assist in supporting the weight of the tie-bars 21 if properly set. This is done by flattening the spring connection somewhat before its forward end is connected to the draw-bar and thereafter as this end of the spring is forced upwardly to connect with the draw-bar, the entire spring member 25 will be put under tension so as to exert a lifting tendency at its rear end in a manner to assist in supporting the steering lever and tie-bars. In this connection, it is not intended that the steering connection 25 shall carry any of the load of the main frame, I find that in arranging the steering arms 22 in the manner mentioned and providing a separate tie-bar between each arm and the steering lever, that a very satisfactory and efficient steering arrangement is provided wherein all tendency of the parts to bind or the wheels to drag or scrape will be overcome.

Various changes in the construction and arrangement of the several parts may be employed without departing from the spirit of my invention as disclosed in the appended claims.

Having thus described my invention, what I claim and desire to secure by Letters Patent is:

1. In a vehicle, an axle, a frame carried by the axle, semi-elliptical springs on the axle supporting the frame, steering wheels on the axle, a draw-bar having a fixed pivotal connection with the frame, a steering lever having a fixed pivotal connection with the axle, and a connection between the steering lever and draw-bar comprising a leaf spring having points of connection in line with those of the supporting springs and whose elongating movement under compression is coextensive with that of the supporting springs.

2. The combination recited in claim 1, in which the steering lever extends forwardly of the axle and the spring connection is normally in tension to support said lever.

In testimony whereof I have hereunto set my hand in the presence of two subscribing witnesses.

HENRY J. RALSTON.

Witnesses:
W. W. HEALEY,
M. E. EWING.